United States Patent [19]

Kiwak et al.

[11] 4,203,936
[45] May 20, 1980

[54] WATER SLURRY PROCESS FOR MANUFACTURING PHENOLIC RESIN BONDED FRICTION MATERIALS

[75] Inventors: Robert S. Kiwak, Northville; Tung Liu, Southfield, both of Mich.

[73] Assignee: The Bendix Corporation, Southfield, Mich.

[21] Appl. No.: 923,883

[22] Filed: Jul. 12, 1978

Related U.S. Application Data

[63] Continuation of Ser. No. 754,477, Dec. 27, 1976, abandoned.

[51] Int. Cl.² .......................... B29G 1/00; H05B 9/00
[52] U.S. Cl. ........................................ 264/26; 106/36; 264/87; 264/120; 264/294
[58] Field of Search ................. 264/25, 26, 86–87, 264/294, 120; 106/36; 162/155, 165

[56] References Cited

U.S. PATENT DOCUMENTS

| | | | |
|---|---|---|---|
| 2,252,991 | 8/1941 | Steck | 106/36 |
| 2,343,330 | 3/1944 | Sawyer | 264/87 |
| 3,290,423 | 12/1966 | Hatch et al. | 264/294 |
| 3,630,012 | 12/1971 | Guertler | 162/155 |
| 3,647,722 | 3/1972 | Albertson et al. | 162/165 |
| 3,736,159 | 5/1973 | Gibson et al. | 264/86 |
| 3,935,060 | 1/1976 | Blome et al. | 264/86 |
| 3,976,728 | 8/1976 | Hawthorne | 264/26 |

Primary Examiner—Jeffery R. Thurlow
Attorney, Agent, or Firm—Leo H. McCormick, Jr.; Ken C. Decker

[57] ABSTRACT

A process for producing an organic friction article from a composition of materials in a dust free environment. Water is mixed with the composition of organic materials to produce a slurry. A fixed volume of the slurry is communicated into a first mold. The slurry in the first mold is compressed to remove up to 95% by weight of the water to form a briquette. The briquette is conveyed to a force air oven or dielectric heater where the water is further reduced to about 1% of the weight of the briquette. This dry briquette is then placed in a second mold and pressed into the shape of a friction pad. The pressed friction pad is placed in an oven and heated to cure the resin in the composition of materials to complete the manufacture of the organic friction pad.

9 Claims, 1 Drawing Figure

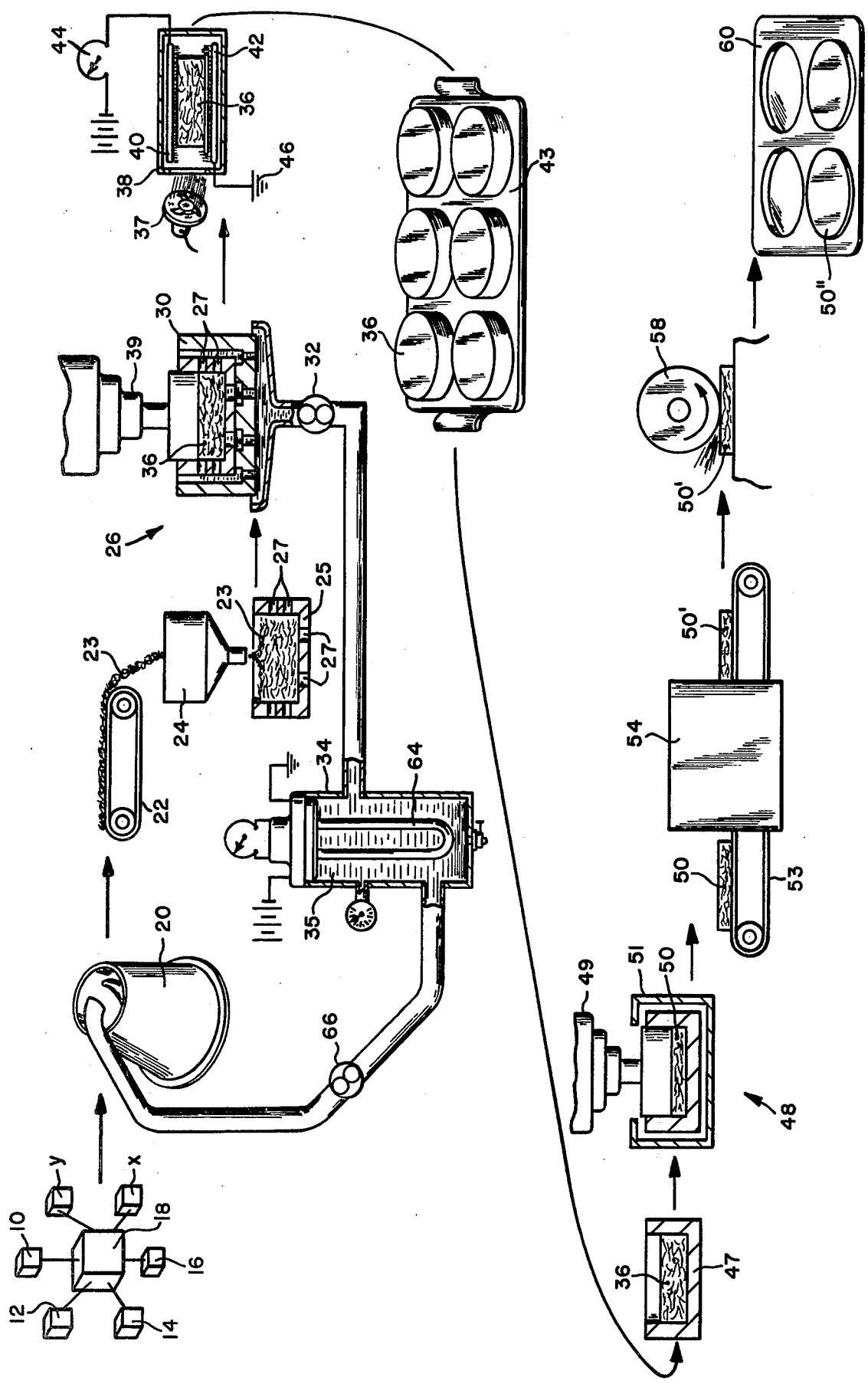

WATER SLURRY PROCESS FOR MANUFACTURING PHENOLIC RESIN BONDED FRICTION MATERIALS

This is a continuation of application Ser. No. 754,477, filed Dec. 27, 1976, now abandoned.

BACKGROUND OF THE INVENTION

In the manufacture of organic friction pads it has been considered essential that all water be removed from the composition of materials before curing the resin binder contained therein. If the water content is greater than 2% by weight of the composition of materials, the heat required to cure the resin in the composition of materials in evaporating the water can cause bubble marks and/or voids adjacent the surface of the friction pad. Therefore, all the ingredients in the composition of materials are dried before being mixed together to form a friction pad.

However, the density of the dry asbestos as compared to the other ingredients in the composition of materials requires substantial mixing before a uniform composition of materials is obtained. Unfortunately, such mixing causes a portion of the asbestos to become airborne and polute the surrounding environment. Often the amount of such airborne asbestos exceeds the allowable limits set in the United States by the Occupation Safety and Health Act of 1970. In an effort to maintain the quality of air within the allowable limits, most manufacturers have discovered that extensive air filtration systems are required in existing structures.

SUMMARY OF THE INVENTION

We have devised a dustless process for manufacturing organic friction pads without the need for remodeling existing manufacturing facilities.

In this dustless process, water is mixed with the composition of materials in a mixer to form a slurry. After a uniform slurry is achieved, it is transported to a storage container. A fixed volume of slurry is measured into a first mold and a compressive force is applied to the slurry to remove up to 95% by weight of the water therefrom and create a briquette. The briquette is removed from the first mold and transported to a forced air oven or dielectric heater. The internal resistance of the ingredients in the briquette to an electric field in the dielectric heater causes the temperature of the briquette to rise. This temperature rise of the briquette is from the inside toward the surface. As the temperature of the briquette increases, water in the briquette is driven toward the surface and evaporated into the surrounding environment. When the water content of the briquette is about 1% of the total weight of the composition of material, the dry briquette is removed from the dielectric heater. The dry briquette is transported to a second mold and a compressive force applied to preform a friction pad to a desired shape. The preformed friction pad is removed from the second mold and bent into a desired shape. Thereafter the preformed friction pad is transported to an oven where the temperature is raised sufficiently to cure the resin contained therein. After curing of the resin, the friction pad is removed from the oven and ground to a final specification.

It is the object of this invention to provide a process for the manufacture of a water slurry briquette from which an organic friction article can be produced.

It is another object of this invention to provide a process of manufacturing an organic friction pad in a relatively dust free environment.

It is another object of this invention to provide a slurry process of manufacturing an organic friction pad.

It is a further object of this invention to provide a method of removing water from a briquette through a dielectric heater device.

It is a still further object of this invention to provide a method of water slurry manufacturing an organic friction pad with a means of maintaining the relationship between the ingredients in the composition of material, even though some of the ingredients are soluble in water which is ultimately removed from the organic friction pad.

These and other objects will become apparent from reading this specification and viewing the drawings.

BRIEF DESCRIPTION OF THE DRAWINGS

The drawing schematically illustrates the steps that make up the process of manufacturing a brake friction pad according to this invention.

DETAILED DESCRIPTION OF THE INVENTION

The drawing illustrates a process for manufacturing an organic friction pad in accordance to the principles of this invention.

Dry ingredients retained in storage containers 10, 12, 14, 16, x and y are combined into an enclosed batching bin 18 in a desired relationship depending on the specific formula selected for an organic brake friction pad. These dry ingredients, which for organic brake friction pads always include as a minimum resin, asbestos, cashew nut powders, an elastomeric material, and a friction modifier, are conveyed from the batching bin 18 to the slurry mixer 20. The dry ingredients are tumbled in the slurry mixer 20 for about 10 minutes to disburse the heavier ingredients in the composition of materials throughout the low density asbestos. Thereafter, water with hexamethylenetetramine, commonly referred to as hexa, in the solution is added to the dry ingredients to produce a slurry 23. When a uniform slurry 23 is achieved, the slurry 23 is dumped from the mixer 20 and transported on a belt conveyor 22 to a hopper 24 in a briquetting machine 26.

The briquetting machine 26 has a first station where a fixed volume of slurry is removed from the hopper 24 and poured into a first mold 25. The first mold 25 is transported to a dewatering chamber 30 at a second station where a compressive force is applied to the slurry. A pump 32 creates a force which draws water from the dewatering chamber 30 and communicates the same into a water holding tank 34. The compressive force on the slurry is such that up to 95% by weight of the initially added water and hexa are removed to produce a briquette 36.

The briquette 36 is conveyed into a dielectric dryer 38 and placed between a first plate 40 and second plate 42. The first plate 40 is connected to an adjustable source of electrical energy 44 and the second plate 42 is connected to ground 46. The source of electrical energy 44 produces an alternating electric field between the first and second plates 40 and 42. By adjusting the output of the source of electrical energy, the frequency of the alternating electrical field is changed. The selected frequency causes the movement of the molecules of the material in the briquette 36 to speed up and generate heat inside the briquette 36. This internal heat drives any water contained in the briquette 36 toward its external surface. A fan 37 passes warm dry air over the external surface of briquette 36 to remove the water as it is deposited on the surface. The briquette 36 is retained in the dielectric dryer 38 until the water in the briquette approaches 1% by weight of the dry ingredients in the composition of materials and thereafter conveyed to a storage container 43.

The dry briquette 36 is removed from the storage container 43 and placed in a second mold 47. The dry briquette 36 and second mold 47 are conveyed to a press station 48. The press station 48 is a cylinder 49 which extends into an oven 51. The temperature of the briquette 36 is raised to about 350° F. in the oven 51 and a compressive force of up to 6000 psi is applied thereto by cylinder 49 to create a preformed organic friction pad 50 having a desired density and shape. The preformed organic friction pad 50 is then conveyed to an oven 54. The temperature in the oven 54 is maintained at about 600° F. This 600° F. temperature cures the resin in the composition of material to form a matrix for holding the other ingredients in a fixed relationship. The cured organic friction pad 50' is removed from the oven 54 and passed through a grinder 58 to obtain a brake pad 50" having a final desired thickness before being packaged in storage container 60.

PREFERRED MODE OF OPERATION OF THE INVENTION

In order to evaluate the process, a typical organic composition of material having a large percentage of asbestos was chosen from the following ingredients in Table 1.

Table 1

| Material (Dry Ingredients) | % by Volume of Total Mix | Preferred Limits |
|---|---|---|
| Cashew Nut Powders | 21 | 15-25 |
| *Organic Modifiers | 10 | 6-10 |
| **Inorganic Modifiers | 5 | 4-8 |
| Graphite or Carbon Particles | 1 | 0-10 |
| $\phi$ Phenolic Resin | 17 | 15-25 |
| Asbestos | 46 | 40-50 |
| | 100% | |

*Elastomeric materials, natural and synthetic rubber scrap, lates, crude molasses, asphaltic base materials, etc.
**Barytes, whiting, talc, rotten stone, metal powders, etc.
$\phi$The Phenolic Resin contains from 7-15% of powdered hexa (hexamethylenetetramine) ground together with the novolak to give an intimate mixture.

Since it is known that hexa is soluble in water, it is necessary to add hexa to the water in the storage container 34 to assure that the selected mixture of ingredients in the batching container 18 are essentially the same as that in the dry briquette 36. From experiments it has been determined that from 0°-100° C. hexa has a soluble rate of about 46% by weight. The amount of hexa to be formulated into the water in storage chamber 34 is a function of the moisture content of the briquette 36 after dewatering by the press operation.

The Phenolic Resin in the example in Table 1 contains about 10% powdered hexa. Therefore, the specific composition contains about 1.7% hexa by weight. In order that the dry briquette 36 has the same hexa content as the dry mixture of ingredients in the batching bin 18, it is necessary that the water in the slurry contain hexa. The following formula can be used to calculate the solution concentration of hexa required to be added to the water in storage container 34.

% by weight of hexa in water solution =
$$\frac{1.7 (100 - \% \text{ H}_2\text{O in briquette})}{(\% \text{ H}_2\text{O in briquette}) + 1.7}$$

The percentage of $H_2O$ in the briquette 36 can be obtained by comparing the weight of the dry ingredients in the composition to the weight of the briquette before drying in the dielectric dryer 38. The following table was prepared to illustrate the various amounts of hexa required in the slurry water for maintaining the hexa in the composition in a stable condition.

TABLE 2

| Moisture Content of Briquette 36 (% $H_2O$ by Weight) before drying | Weight % hexa in Solution of Slurry Water |
|---|---|
| 5 | 24 |
| 10 | 13 |
| 15 | 9 |
| 20 | 6 |
| 25 | 5 |
| 30 | 4 |

From experimentation it was determined that a dewatering press pressure of about 6000 psi would remove about 90% of the water from the slurry 23 and therefore 13% by weight of hexa was added to the slurry water 35 in container 34.

However, in order to manufacture brake pads, it is necessary that the water be removed from the slurry rapidly. Therefore, it was necessary to evaluate the flow of water out of the slurry during the dewatering process. The flow characteristics can be evaluated through the following equation:

$$Q = P\phi A / \eta L$$

where:
Q = rate of flow
P = pressure across the slurry
L = thickness of filter medium
A = Area of filter
$\eta$ = viscosity of the fluid
$\phi$ = viscous permeability of the slurry In obtaining operational values for this equation, the following conclusions were reached:

1. The higher the press pressure in the drawing station 26 the better, however, pressure capable of extruding the slurry 23 into the filter (openings 27 in the first mold) are unsatisfactory. Therefore, a maximum P of 6000 psi was selected.
2. The ratio of A/L can be optimized by draining water from all sides of the slurry 23 in the mold 25;
3. Water must pass through 2 permeable layers, the permeable constant of the dewatering press 30 and the layers of dewatered slurry. Since the friction material formula remains constant, the shape of the first mold 25 must contain as many and as large holes 27 as possible without allowing the slurry 23 to be extended by the press pressure; and
4. The viscosity, $\eta$ of the water in the slurry 23 is proportional to temperature. The viscosity of water is well known and as illustrated in the following Table 3 increases with temperature.

TABLE 3

| Temperature of $H_2O$ (° C.) | Viscosity |
|---|---|
| 20.2 | 1.0 |
| 55 | .51 |

TABLE 3-continued

| Temperature of $H_2O$ (° C.) | Viscosity |
|---|---|
| 71 | .40 |
| 95 | .35 |

In solving this equation for Q it was readily apparent that the value for $\eta$ controlled the speed at which the water could be removed from the slurry 23. Therefore, the water in the slurry container 34 was heated to a temperature of between 75°–85° C. by emergent heating coil 64 before being communicated by pump 66 to the slurry mixer 20.

The composition of materials selected from the ingredients in Table 1 were combined in a batching bin 18 and placed in the slurry mixer 20. The heated water with 13% hexa in solution 35 were added to the dry ingredients in the slurry mixer 20 at a weight ratio of about 2:1. This aggregation of materials and liquid were mixed for about 10 minutes to produce a smooth and uniform slurry 23. The temperature of the slurry 23 which was about 75° C. at the end of the mixing sequence was reduced to about 70° C. after being conveyed to the hopper 24 in the briquetting machine 26. A volume of slurry was measured from the hopper 24 and poured into a first mold 25. The first mold 25 was transferred to the dewatering chamber 30 and a force of 6000 psi applied to the slurry for 10 seconds by ram 39 to produce a briquette 36. 94% of the initial water and hexa in solution was removed from the slurry 23 in this dewatering procedure. Thereafter, the briquette 36 was removed from the first mold 35 and placed between the first and second plates 40 and 42 in the dielectric heater 38. The electric field between the first plate 40 and the second plate 42 causes the movement of the molecules of the ingredients in the briquette 36 to speed up and raise the temperature of the briquette 36. The increase in temperature is greatest at the center of the briquette and proportionally decreasing toward the surface of the briquette 36. This internal heating of the briquette drives the water contained therein toward the surface of the briquette 36. Fan 37 blows warm dry air over the surface and removes any water deposited thereon by the dielectric heating process. When the water content in the briquette 36 reaches about 1%, the briquette 36 is placed on storage container 43.

The dry briquette 36 upon removal from the storage container 43 is placed in a second mold 46. The second mold 46 and briquette 36 were heated to a temperature of about 325° F. in oven 51. Thereafter, a pressure of about 6000 psi was applied to the briquette 36 by ram 49 for about 8 minutes. The resulting preformed friction pad 50 has a density of about 1.96 gm/cc. The preformed friction pad 50 is transported by conveyor 53 to oven 54. The preformed friction pad 50 is heated to about 550° F. in about 4 hours and held at this temperature for about 2 hours to cure the resin to produce a cured friction disc 50'. The friction disc 50' upon removal from the curing oven 54 has a density of 1.91 gm/cc. The cured friction disc 50 is passed through a grinder 58 and ground to a specific size corresponding to a backing plate for a disc brake. The ground friction disc 50" was attached to the backing plate and compared with the test results from a friction pad with the same formula produced through the well known dry mix procedure in an Inertial Dynamometer.

The following table is a tabulation of the results of the comparison test:

| INERTIAL DYNAMOMETER DOT TEST 101 | | |
|---|---|---|
| | Dry Mix | Slurry Mix |
| Preburnish Effectiveness | 736 | 980 |
| Second Effectiveness | 902 | 1040 |
| Final Effectivenss | 586 | 640 |

As evidenced, friction disc 50" produced by the slurry process had a higher brake effectiveness during each sequence of the braking test.

We claim:
1. A dustless process for producing organic friction articles comprising the steps of:
   mixing together dry ingredients including a thermosetting phenolic resin containing from 7–15% by weight of hexamethylenetetramine, asbestos and friction modifiers to form a composition of material;
   adding a solution of water and from 4–24% by weight of hexamethylenetetramine to said composition of material to form a slurry;
   communicating a fixed volume of said slurry into a first mold;
   compressing said slurry in said first mold to remove up to 95% by weight of said solution to form a briquette;
   drying said briquette through dielectric heating to heat the briquette from the inside to the outside and remove up to 99% by weight of the water in said solution from the briquette to reestablish substantially the same weight relationship of ingredients therein as in said composition of material; and
   curing the dried briquette in a second mold to a desired shape and density.
2. The process as recited in claim 1 wherein the step of compressing said slurry includes:
   removing up to 95% by weight of said water.
3. The process, as recited in claim 2, wherein said step of compressing said slurry includes:
   retaining said solution removed from said slurry in a storage container for reuse in another mixture.
4. The process, as recited in claim 1, further including the step of:
   weighing said dry ingredients in order to determine the amount of solution to be added to produce a ratio of water to dry ingredients of 2:1.
5. The process, as recited in claim 1, further including the step of:
   heating said water to a temperature up to 90° C. before adding to said dry ingredients.
6. A process for producing a friction pad, comprising the steps of:
   mixing a solution of water and from 4–24% by weight of hexamethylenetetramine with a composition of material which includes a dry phenolic resin and hexamethylenetetramine powder to form a slurry;
   communicating said slurry to a mold;
   compressing said slurry in the mold to remove up to 95% of the water in said solution to form a briquette;
   drying said briquette to remove substantially all of said solution and thereby reestablish the dry weight relationship of said phenolic resin and hexamethylenetetramine as in the composition of material; and curing the briquette at a temperature of up to 600° F. to establish a desired shape and density for the friction pad.

7. The process, as recited in claim 6, wherein the step of drying includes:

heating the briquette in an oven having a uniform temperature of between 120°-140° F. for a predetermined period of time to evaporate said solution from the briquette; and circulating air through said oven to remove said evaporated solution from the oven to maintain the relative humidity in the oven below a predetermined range.

8. A dustless process for producing organic friction articles comprising the steps of:

mixing together dry ingredients including a thermosetting phenolic resin containing from 7-15% by weight of hexamethylenetetramine, asbestos and friction modifiers to form a composition of material;

adding a solution of water and from 13-24% by weight of hexamethylenetetramine to said composition of material to form a slurry;

communicating a fixed volume of said slurry into a first mold;

compressing said slurry in said first mold to remove said solution to form a briquette having from 5-10% by weight of water therein;

drying said briquette through dielectric heating to heat the briquette from the inside to the outside and remove water from the briquette and reestablish substantially the same weight relationship of ingredients therein as in said composition of material; and compression molding the dried briquette in a second mold to a desired shape and density.

9. A process for producing a friction pad, comprising the steps of:

mixing a solution of water and from 13-24% by weight of hexamethylenetetramine with a composition of material which includes a dry phenolic resin and hexamethylenetetramine powder to form a slurry;

transferring said slurry to a mold;

compressing said slurry in the mold to remove the solution and form a briquette having from 5-10% by weight of water therein;

drying said briquette to move additional water and reestablish the dry weight relationship of said phenolic resin and hexamethylenetetramine as in said original composition of material; and compression molding the briquette at a temperature of up to 600° F. to establish a desired shape and density for the friction pad.

* * * * *